US005978799A

United States Patent [19]
Hirsch

[11] Patent Number: 5,978,799
[45] Date of Patent: Nov. 2, 1999

[54] SEARCH ENGINE INCLUDING QUERY DATABASE, USER PROFILE DATABASE, INFORMATION TEMPLATES AND EMAIL FACILITY

[76] Inventor: G. Scott Hirsch, 18 Gimmel HaPalmach, Jerusalem, Israel, 92542

[21] Appl. No.: 09/015,421

[22] Filed: Jan. 29, 1998

Related U.S. Application Data

[60] Provisional application No. 60/035,835, Jan. 30, 1997.
[51] Int. Cl.⁶ .................................................. G06F 17/30
[52] U.S. Cl. .................................................................. 707/4
[58] Field of Search ........................................... 707/4

[56] References Cited

U.S. PATENT DOCUMENTS

| | | | |
|---|---|---|---|
| 5,632,022 | 5/1997 | Warren et al. | 395/350 |
| 5,742,806 | 4/1998 | Reiner et al. | 395/600 |
| 5,754,939 | 5/1998 | Herz et al. | 455/4 |
| 5,864,846 | 1/1999 | Voorhees et al. | 707/5 |

*Primary Examiner*—Wayne Amsbury
*Assistant Examiner*—Mark Terry
*Attorney, Agent, or Firm*—Majestic, Parsons, Siebert & Hsue P.C.

[57] ABSTRACT

A supra-search engine tool includes a distributed computer system and automatically structures and organizes information requests, then independently searches, requests and organizes the data from information providers, including a variety of search engines and websites to match the tailored requests of the information consumers. The retrieved and processed information is then accessible via website, browser, fax, email, voicemail, mail, software and other communication means.

2 Claims, 5 Drawing Sheets

5,978,799

SEARCH ENGINE INCLUDING QUERY DATABASE, USER PROFILE DATABASE, INFORMATION TEMPLATES AND EMAIL FACILITY

This application claims the benefit of U.S. Provisional Application No. 60/035,835 filed Jan. 30, 1997.

BACKGROUND OF THE INVENTION

The expansion of the World Wide Web allows consumers or others interested in acquiring and compiling information from a number of sources a vast new opportunity to quickly gain access to multiple information providers. Unfortunately, what often results to a consumer is information overload because there is as yet no uniform way for a consumer such as a potential buyer to access multiple web sites at once, obtain the information they are interested in, and have the information presented to them in a compiled and easy-to-understand format.

For example, a user wishing to purchase automotive insurance on the Internet might choose to use one of a number of Internet search engines to search for the text "automobile" near "insurance." Such a search conducted at the time this provisional application is filed yields over 9,000 hits to different URLs on the Internet and that number will only increase.

Using currently available Internet tools, a user's only option is to visit all 9,000 of these URLs or to select URLs at random in order to seek individual price quotes or information about car insurance. In many cases, the information sought by the user might not exist on the URLs accessed, and the user will be left with the option of sending an individual e-mail message to any websites from which the user wishes to request that information.

What is needed is an automatic supra-search engine that allows a user either to select from a number of standard topics or to select from a number of standard queries or to compose his own questions, and which will then use the resources available on the Internet, including proprietary and commercially available search engines, to browse the Internet and seek answers to the questions posed by the user.

SUMMARY OF THE INVENTION

The present invention is a supra-search engine tool made of a distributed computer system that automatically structures and organizes information requests, then independently searches, requests and organizes the data from information providers (including a variety of search engines and websites) to match the tailored requests of the information consumers. The retrieved and processed information is then accessible via website, browser, fax, e-mail, voicemail, mail, software and other communication means.

According to one embodiment, information providers include front end templates into a database in which they can enter and update the relevant information contained on their sites in a structure consistent with providers of similar information. For example, a company providing medical insurance might include in its template standard questions that would be asked of such a company, such as rate information and availability of certain types of coverage.

These templates can reside on the supra-search engine web site or they can be delivered via automated e-mail, or distributed application program, e.g. Java Applet, in response to a consumer's information request. For example, a customer information selection of medical insurance would retrieve a list of relevant questions and terms that may be different in detail but similar in format to those used for searching sites dealing with automobile parts. The questions and terms can be accepted as is or added to or deleted for the individual search. Additionally, users may be asked to input select information specific to the topic to improve the search results and assist customization. The data entered into the database this way will be deliverable to the consumer in a compact form or accessible online.

Information providers also have the option of including un-categorized data that may be too specific to their site for inclusion in the general templates. The information entered into this database is stored along with other relevant data (such as, e-mail addresses, URLs, etc.), at the search engine site and optionally the information provider's site itself.

According to the invention, information consumers are provided with front end templates into the database that allow them to select from hierarchical menus and lists of questions and options in order that the system can retrieve only the most relevant information entered by the providers. Information users or consumers have the option of specifying search criteria and questions will be addressed using automated "robot" searches as well as unique automated e-mail inquiries.

The information specified using the front end templates is processed in order to generate a proper search and is linked or fed to one or more search engines, either proprietary or commercial. The accessed search engines perform the desired searches in the background. The data returned by the search engines is then processed according to the invention to extract the desired information from the relevant web sites, using either the initial returned data or by returning to the site to make a subsequent search for these data. In some cases, the invention will contact a relevant site automatically by finding an e-mail address on each website or other source, such as the Internic database, and by delivering a form for the contacted individual to fill in with the requested information. When the e-mail form is then received from the relevant website, it is automatically processed to extract the data given, and to prepare the data for delivery to the initial requester as well as to process the data for inclusion in the overall search database for subsequent use. The contacted information provider may then be given a link or contact point or even automated periodic e-mail messages in order to keep the information provided current.

Information retrieved by the system can be delivered in "real time" to the consumer or, in the case of automated e-mail queries, the consumer can be notified by a different e-mail in the case of a non-instantaneous search. This different e-mail can contain a notification of search results ready to be downloaded from the web site or can contain the results of the search itself.

Information providers also have the option of providing the search system local to their individual sites by including a modified system interface and database. The results of this search can be also delivered in real time or via e-mail. This serves to make searching of individual sites more useful by applying a consistent structure to the interface used by the information consumer and the information returned by the information provider.

The system uses robotic search programs to find relevant information on indexed and un-indexed sites as well as to find new sites to index. This will serve to keep the information up to date, complete and accurate. This also allows discrepancies between the data found automatically and the data entered manually to be resolved before delivery to the consumer.

The invention helps information providers by organizing raw data into a consistent and useful format and helps information consumers by automatically sifting through potentially huge amounts of raw data and presenting it in a timely and usable format. The invention also serves to reduce unnecessary and wasteful traffic on the Internet or other networks by storing and organizing data at one or more central locations rather than collecting large numbers of pointers to remote locations that may contain only data that is marginally relevant, if at all, to the consumers requests. By minimizing and customizing searches and time on the Internet, local phone and Internet provider companies can save on capacity costs. The system can be used for managing and retrieving information across proprietary and open networks.

As an example of an important element of gathering information, consider the category "Measurements of Success," which would be included in a general topic pull-down screen or part of a click-on icon. If the user enters a topic for which detailed questions in each category are in the database, those questions would pop up for each standard topic and give the user the option of selecting any or all of the pre-determined questions within each topic group. The user could also add his or her own questions which would be stored in a database, and if common, potentially added to the given topic or category for future user reference. For example, if the user topic was a pre-researched topic with detailed database questions, such as "telecommunications," the general category of "Measurements of Success" would be customized to that topic and questions such as "What is your average network down time per year for the last three years? What is the P grade quality of the service given? How extensive is your answer supervision? Etc." would appear for user selection. Additionally, the information consumer may have entered information about themselves which can alter the specific questions. The history of inputted information, selected topics, and selected or written questions can be used to build a profile on the information consumer for commercial purposes and to anticipate future information requests.

For those topics for which there are no stored questions in the database, the category "Measurements of Success" would pop up a more general list of questions such as "What are the measures of success and how does your product or service rate?" The invention initially may be geared towards purchasing products and services, but even more general overview topic questions can be added.

DESCRIPTION OF THE PREFERRED EMBODIMENT

Figure 1:
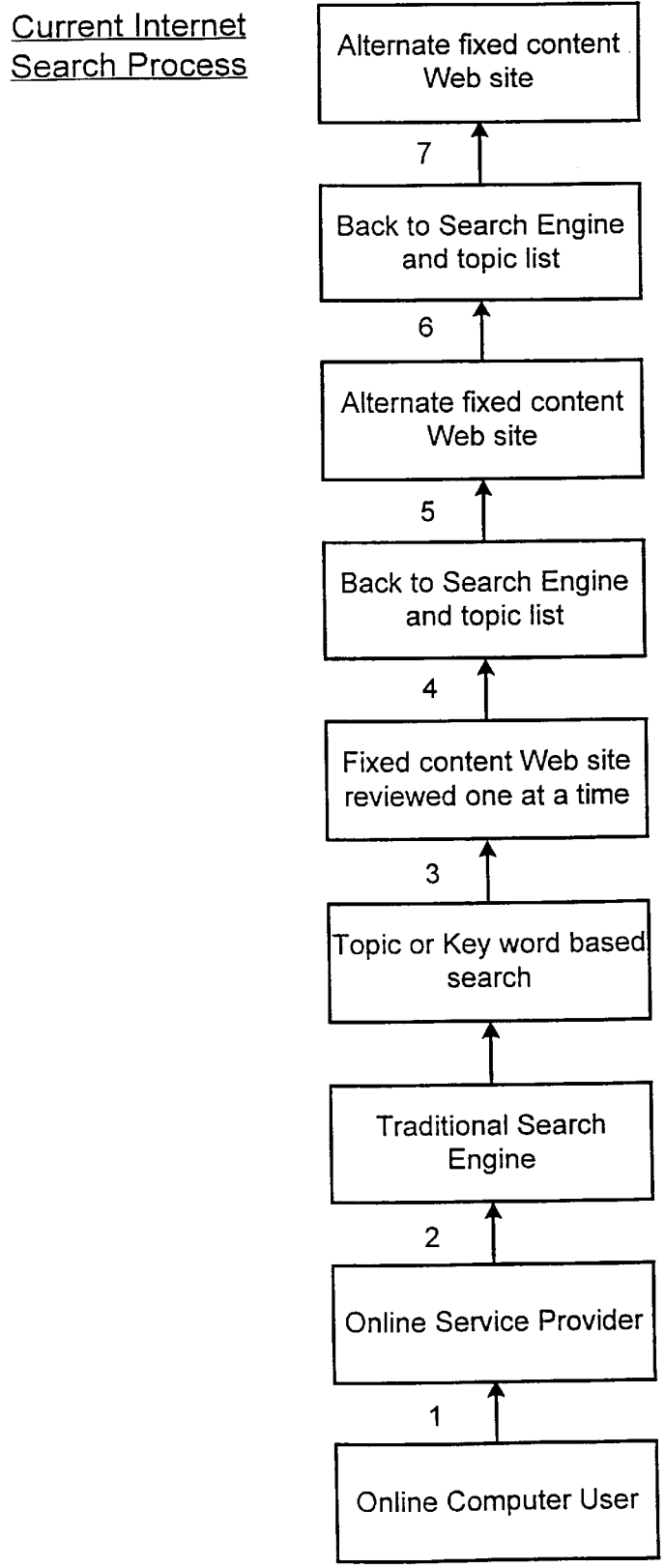
FIG. 1 shows a flowchart of a prior art search method.
Figure 2:
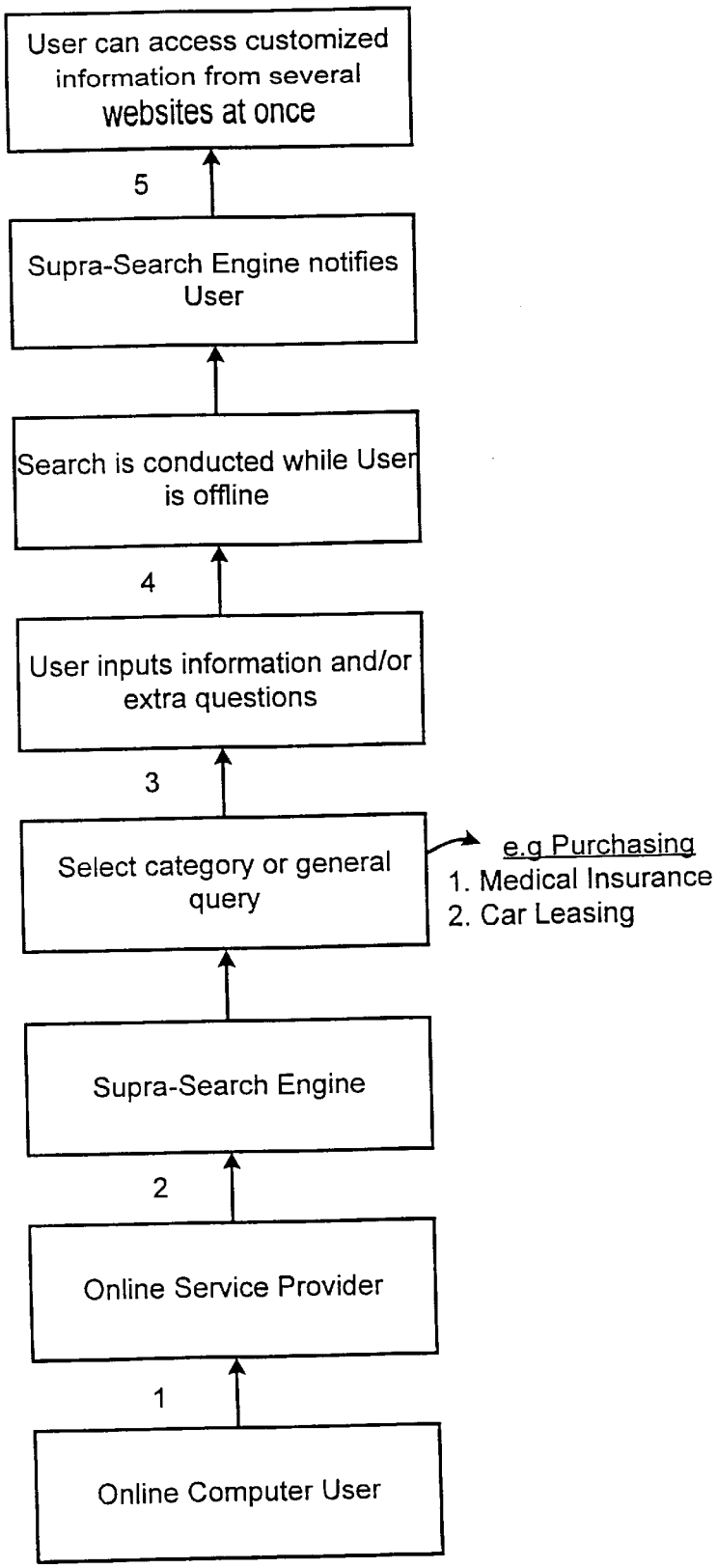
FIG. 2 shows a flowchart of a search according to one embodiment of the invention.
Figure 3:
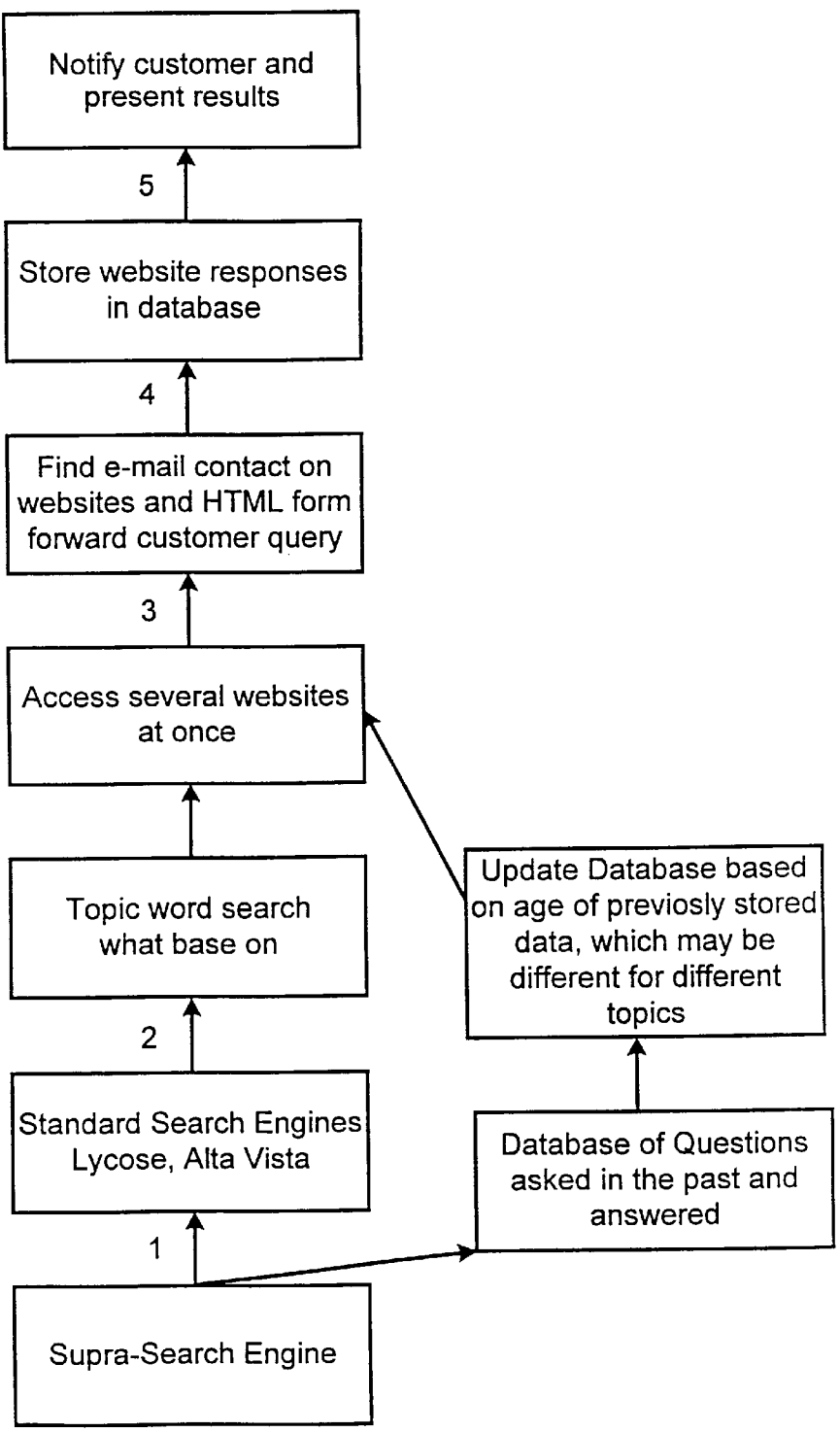
FIG. 3 shows a flowchart of a supra-search method according to one embodiment of the invention.
Figure 4:
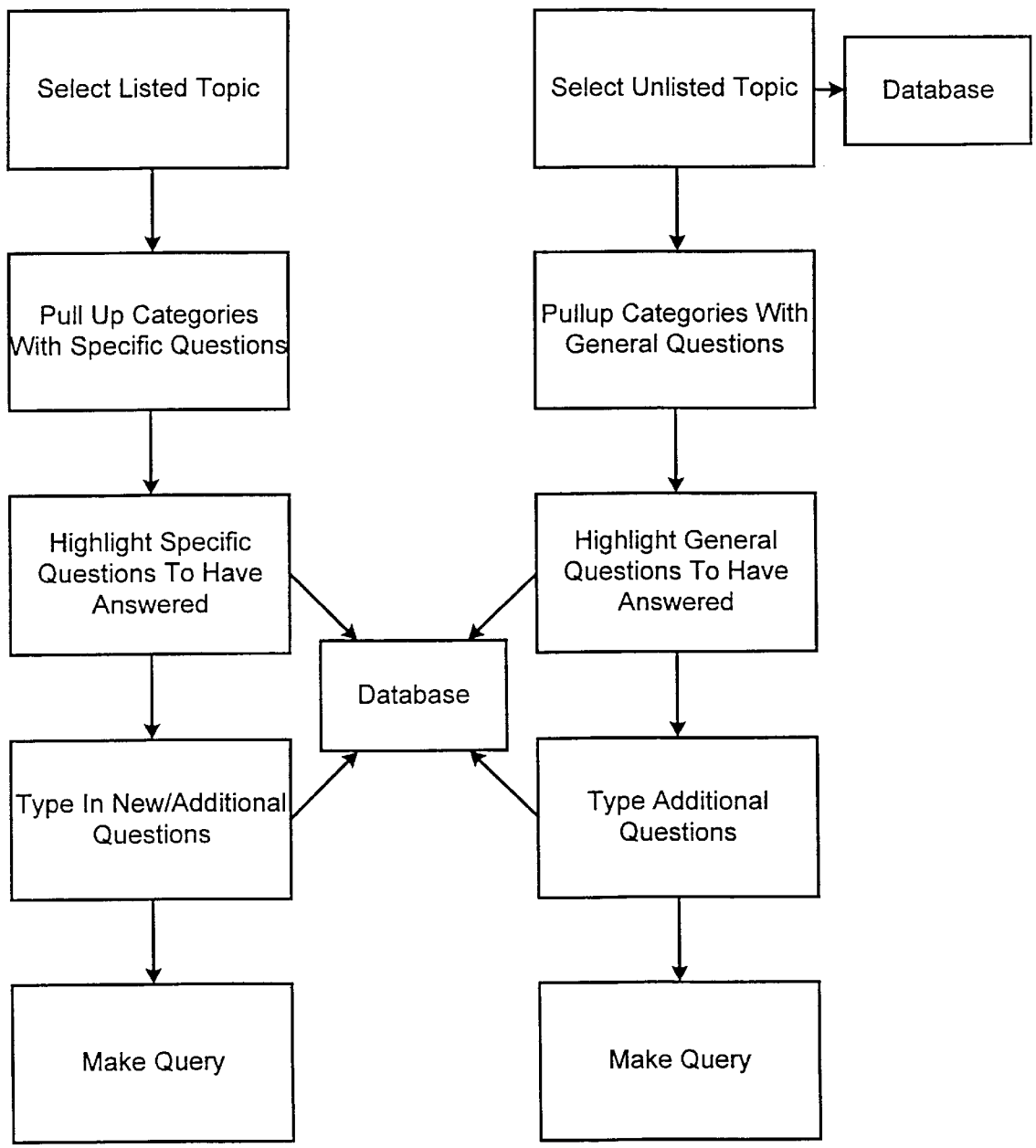
FIG. 4 shows a flowchart of a question methodology according to one embodiment of the invention.
Figure 5:
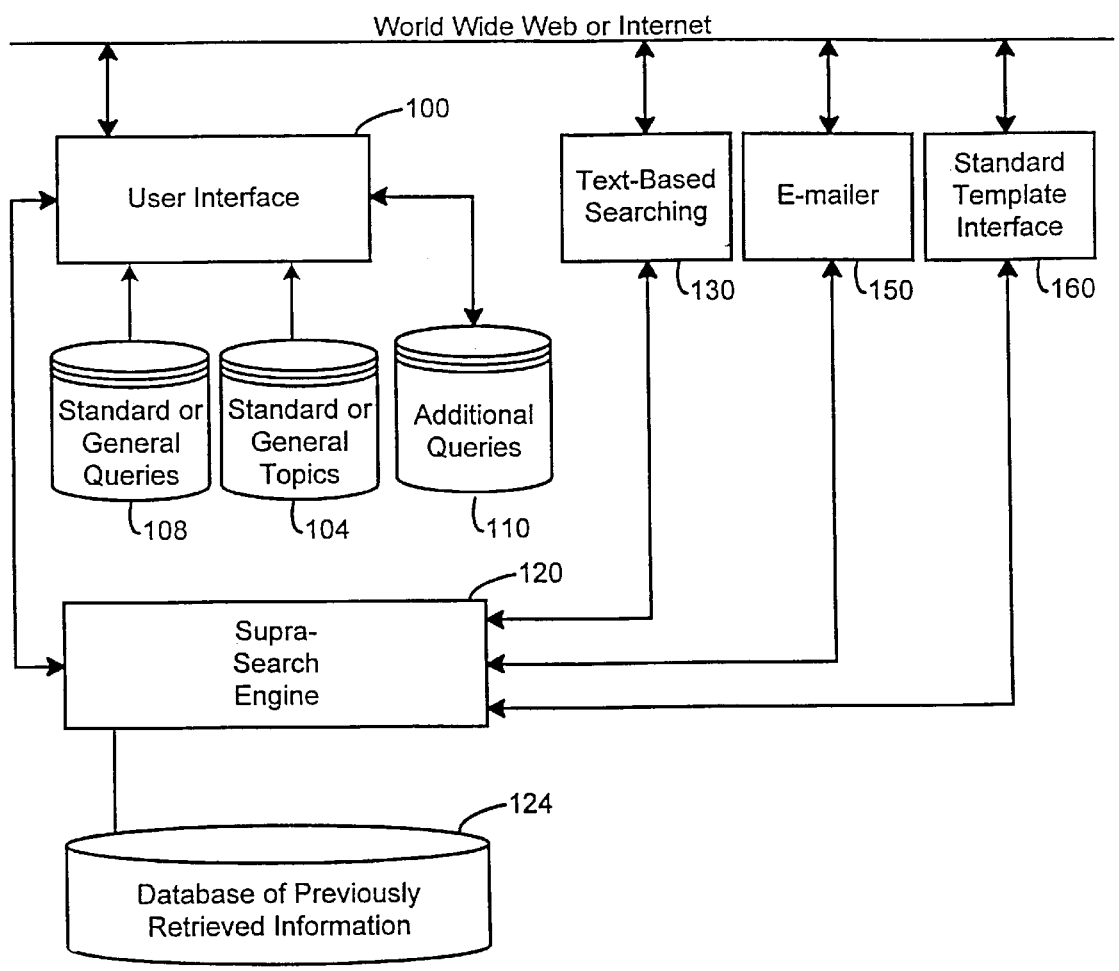
FIG. 5 shows a block diagram of one embodiment of the invention.

FIG. 5 shows a block diagram of one embodiment of the invention. A user usually interacts with the supra-search engine through a user interface 100. User interface 100 presents to the user a number of possible standard query topics from a database 104. The user has the option of selecting one of these standard topics or selecting his or her own topic. Each standard topic reveals a specifically correlated list of standard queries. The general topic reveals a correlated list of general queries. Users can type in additional queries if queries are not found in the standard queries or general queries presented by the user interface. These additional queries are stored by the user interface in a database 110 for further processing. After the user has interacted with the user interface to specify the information in which he or she is interested, user interface 100 communicates this query to supra-search engine 120.

According to the invention, supra-search engine 120 can gather information responsive to the user query from a number different sources including, optionally, a database 124 that it maintains as a result of previously executed searches. Supra-search engine 120 also may retrieve information from a wide ranging search of the World Wide Web via a text-based search engine 130, which may be either a proprietary text-based searching engine or any of a number commercially available text-based searching engines. Engine 120 may use the information from text-based searching engine 130 and database 124 to determine a number of e-mail addresses of interest and may send an automatic message to those e-mail addresses containing the user's request via e-mailer 150. Supra-search engine 120 may also retrieve information directly from a standard template interface 160 through which web sites can choose to provide certain standardized information, such as price quotes, that may change frequently and will be of interest to users.

At any time during the search procedure, supra-search engine 120 may communicate to the user either via e-mail and/or other means the current status and/or the content of his search request. According to the invention, the search may take place off-line and over a long period of time as different web sites have an opportunity to respond to e-mail queries.

The invention includes a number of possible configurations, some of which do not include all of the features discussed above.

What is claimed is:

1. A system for conducting supra-searching from a number of information sources, comprising:

a user interface;

a database of standard or general queries;

a database of standard or general topics;

a database for maintaining additional queries;

a database for maintaining user profile information;

an user-interface allowing a user to select topics and queries from said databases and/or to add additional queries;

a supra-search-interface for presenting a user directed set of queries and user profile to a supra-search engine;

a supra-search engine, with access to:
  a text-based search engine;
  an emailer;
  a set of standard templates for interfacing directly with databases provided by information providers; and
  a database of retrieved information; and a presenter for presenting retreived information to a user.

2. A method for formatting queries for conducting supra-searching from a number of information sources, comprising:

providing a user with a choice of selecting from a set of standard topics or an unlisted topic;

for a chosen standard topic:

providing a list of categories with specific questions allowing a user to highlight questions to be answered;

providing a means for a user to ask additional questions;

accessing a database of previously asked and answered questions;

for a chosen unlisted topic:

providing a list of categories with general questions allowing a user to highlight questions to be answered;

providing a means for a user to ask additional questions;

accessing a database of previously asked and answered questions;

generating a query to a supra-search engine.

\* \* \* \* \*